Jan. 16, 1934.   W. S. SPRAGUE   1,943,701
INSULATION AND MEANS EMBODYING THE SAME
Filed May 16, 1932   2 Sheets-Sheet 1

Inventor
WHEELER S. SPRAGUE.

By  Hewitt Griggs Robertson
       his  Attorney

Jan. 16, 1934.  W. S. SPRAGUE  1,943,701
INSULATION AND MEANS EMBODYING THE SAME
Filed May 16, 1932  2 Sheets-Sheet 2

Inventor
WHEELER S. SPRAGUE.
By Hewitt Grigg Robertson
his Attorney

Patented Jan. 16, 1934

1,943,701

UNITED STATES PATENT OFFICE 1,943,701

INSULATION AND MEANS EMBODYING THE SAME

Wheeler S. Sprague, Swarthmore, Pa.

Application May 16, 1932. Serial No. 611,680

6 Claims. (Cl. 72—16)

This invention relates to an improved insulation to be employed as means to prevent passage of heat and cold through a wall or partition of a refrigerator, building, or other structure and one object of the invention is to provide an insulation which is very efficient when in use, extremely durable but light in weight, and economical to manufacture.

Another object of the invention is to so construct the insulation that it may be formed in blocks each of the proper size and shaped to fill space in a wall to be insulated or permit a large space to be filled by a number of blocks united by an air-tight adhesive to prevent leakage between the blocks.

Another object of the invention is to provide a device of this character wherein the insulation consists of stacked sheets of wood pulp, cellulose, or other kinds of cellulose thereby permitting the insulation to be of any thickness necessary according to the use to which it is put.

Another object of the invention is to permit the blocks of insulation to be made up and shipped from a factory according to specification and ready to be installed or the material supplied in bulk by the manufacturer and assembled to form blocks of the desired size and shape by the user.

The invention is illustrated in the accompanying drawings wherein:—

Figure 1:
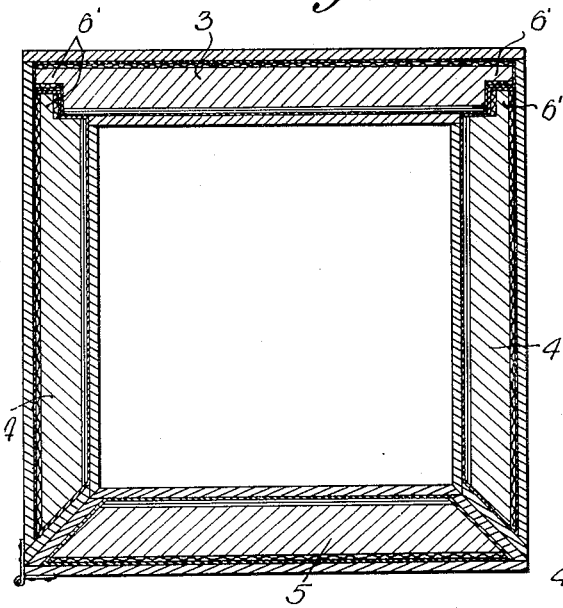
Fig. 1 is a sectional view taken horizontally through a refrigerator provided with the improved insulation.
Figure 2:
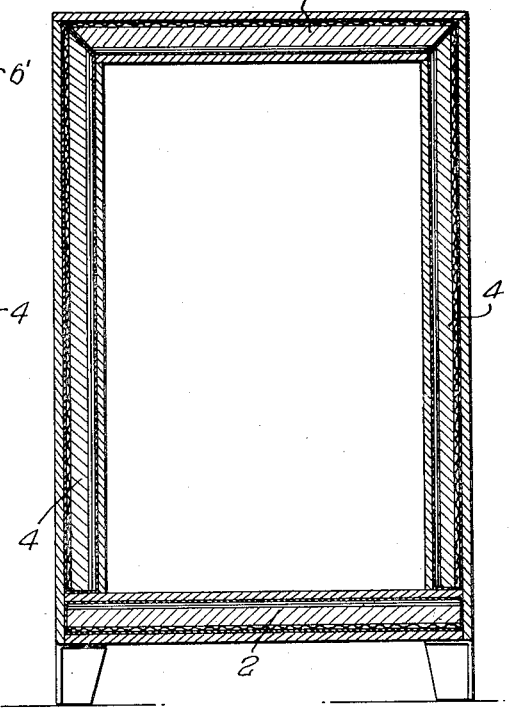
Fig. 2 is a vertical sectional view through the refrigerator.
Figure 8:
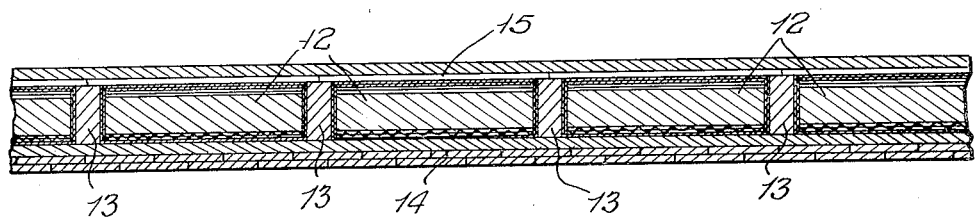
Fig. 8 is a sectional view taken transversely through a wall of a building provided with the improved insulation.

The improved insulation constituting the subject matter of this invention is to be employed as means for preventing passage of heat or cold through a wall or partition into or out of a chamber and while it has been shown incorporated in a refrigerator in Figures 1 and 2 it will be understood that it may be used in connection with the walls or roof of a building as shown in Figure 8 or wherever found practical.

The refrigerator shown in Figures 1 and 2 is of a conventional construction and has a top 1, bottom 2, back wall 3, side walls 4 and a door 5 hingedly mounted for movement into and out of position to close the open front of the refrigerator. All of the said portions of the refrigerator are hollow and tightly sealed to prevent passage of air into or out of chambers defined thereby and may be formed of wood, metal, porcelain or any other material found suitable. The chambers within the hollow walls and door are filled with insulation of the improved construction.

The insulation filling each space or chamber preferably consist of a single block of the proper dimensions and shape to fit snugly therein but may consist of a number of blocks forming a composite block of the proper size if the space is too large for a single block to be conveniently handled.

Figure 3:
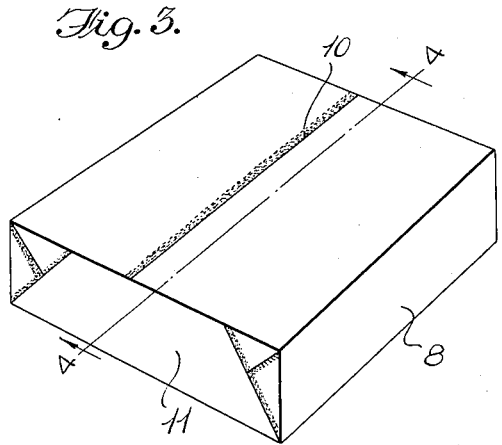
Fig. 3 is a perspective view of a block of insulation formed in accordance with this invention.
Figure 5:
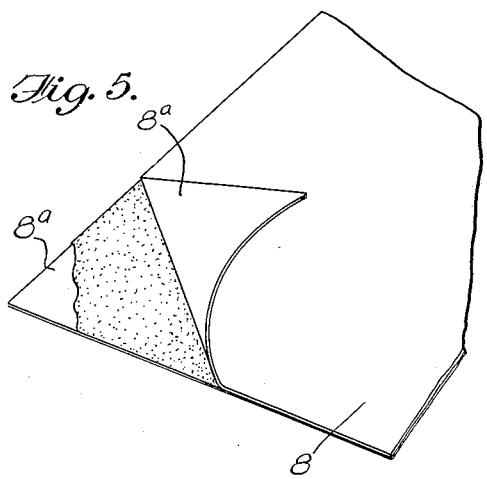
Fig. 5 is a perspective view of a fragment of a sheet of paper used as a wrapper for the insulation.
Figure 4:
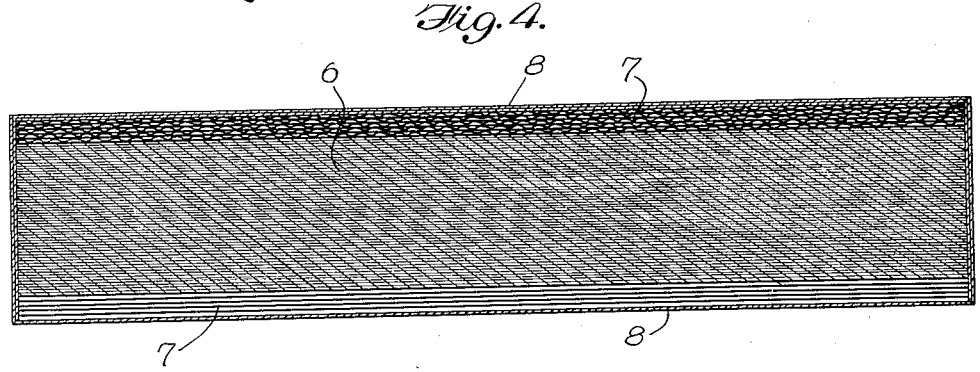
Fig. 4 is an enlarged sectional view taken along the line 4—4 of Figure 3.

Each block is constructed as shown in Figures 3 and 4 and consists of a body 6 of cellulose, reinforcing sheets 7, and a wrapper 8 formed of waterproofed paper and hermetically sealed about the body and reinforcing sheets to form an airtight wrapper. By this arrangement moisture will be very effectively excluded from the cellulose body and reinforcing sheets. The body of cellulose preferably consists of a multiplicity of thin sheets arranged in a stack but it will be understood that a solid mass of cellulose could be used or a number of pads or sections of the proper thickness to form a body of the desired thickness. The reinforcing sheets fit flat against opposite sides of the cellulose body and are sufficiently flexible to permit the block of insulation to be distorted and forced into a curved or irregularly shaped space. While the reinforcing sheets may be formed of any fibrous material or composition found suitable, corrugated paper board of one or several plies is preferably employed and by referring to Figure 4 it will be seen that the grain of one sheet extends transversely of the grain of the other sheet. Therefore when pressure is applied to compress or distort a block in order to force it into place the sheets will not be cracked.

The cellulose and paper board are of light weight but very durable and it has been found that cellulose serves very effectively as an insulation for heat and cold. Due to its lightness large blocks can be easily handled and the insulation will not add materially to the weight of a refrigerator or other structure to which it is applied.

Figure 6:
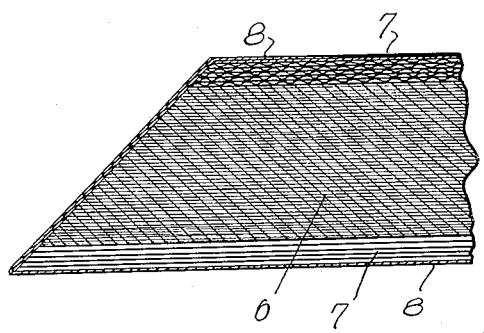
Fig. 6 is a fragmentary sectional view showing the insulation formed with bevelled edge faces.
Figure 7:
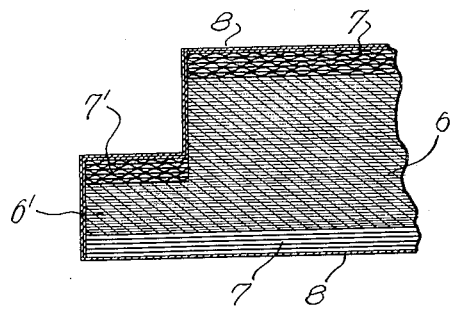
Fig. 7 is a view similar to Figure 6 showing a stepped joint.

After the cellulose body has been placed between the reinforcing sheets, the assembled sheets and body are cut to the proper size and shape and strips of gummed paper or strong thread may be employed to prevent them from moving out of their proper stacked relation to each other. The edge faces may be cut at right angles to flat side faces of the reinforcing sheets to form flat edge faces for the insulation blocks as shown in Figure 4, or they may be bevelled as shown in Figure 6, or cut to form a stepped edge portion as shown in Figure 7. If a stepped edge is formed the portions 7, cut from one of the reinforcing sheets will be used to reinforce the projecting portions or lips 6' of the cellulose body.

The reinforced cellulose body must be protected from moisture to prevent it from becoming soggy and in order to do so it is encased in the wrapper 8. This wrapper consists of a sheet of waterproofed paper having paper plies 8ᵃ between which is disposed a thin film of asphalt or other waterproofing compound. Side edge portions of the wrapper are overlapped and secured by asphalt to form a seam 10 and projecting end portions are folded and secured by asphalt to form the closed ends 11 of the wrapper. After the wrapper has been applied end portions of the block or the entire block may be dipped in asphalt, or analogous material and thereby insure the provision of a hermetically sealed wrapper through which air or moisture cannot pass. The insulating blocks can be made according to specification by a manufacturer and shipped ready for use or the material supplied in bulk and the blocks made up at the place of use.

It will be noted that the comparatively stiff regular outlines of the reinforcing sheets substantially accurately define two dimensions and corresponding contours of the block and that when the whole is then embraced in the protecting covering the relative stiff plane-defining character of the reinforcing sheets then establish with a certain definiteness another dimension, while were it not for such definite outlining of such dimensions and contours the irregular, shapeless, variable dimensions of the cellulose mass, makes any certain calculation of their space-filing dimensions impracticable.

Referring specifically to Figures 1 and 2 it will be seen that spaces in the walls, top, bottom and door of a refrigerator have been filled with insulating blocks, each of which is of the proper shape and dimensions to fit snugly into place. Lower edge faces of the blocks in the hollow walls rest flat upon the bottom and contacting vertical edge faces of these blocks have been shown formed with stepped joints. Upper edges of the wall blocks and contacting edge faces of the insulating block in the top 3 are bevelled. While contacting edge portions of the blocks may be left free it is preferred to apply asphalt to them when they are thrust into place and thereby seal cracks in the joints between contacting clocks and more effectively insulate the interior of the refrigerator. The block of insulation in the door is, of course, formed with beveled edges as it must conform to the shape of the space it fills.

In Figure 8 insulation blocks 12 constructed as previously described have been shown applied to a wall of a building. These blocks fit snugly between studding 13 and completely fill space between the wall 14 and laths 15 to which plaster 16 is applied. It will be understood that a suitable number of blocks will be set in place one upon the other between each pair of studding to extend the full height of a room or building. A roof and floors may be similarly insulated and if so desired sheets of insulation consisting of cellulose between fiber board may be employed in place of laths and plaster as an inside finish for a wall or roof. The insulation when applied to a building serves not only to prevent passage of heat or cold through a wall but will also serve to soundproof a dividing wall between rooms.

Modifications in detail may be resorted to without departing from the spirit of the invention or sacrificing any of its advantages.

Having thus described my invention, what is claimed is:

1. An insulation block comprising the combination with sheets of cellulosic material of irregular and variable contour, of reinforcing sheets of substantially stiff material between which the first named sheets are placed and which are sufficiently rigid to set definite contours and planes and establish two dimensions, and an enclosing covering, confirming the two dimensions of the reinforcing sheets and following their contour and determining the third dimension of the block, so as to form a block, affording a calculation unit as a space filling means, while containing an irregularly and variably compressible mass.

2. Insulation comprising a stack of cellulose sheets, reinforcing sheets having the stack disposed between the same, said reinforcing sheets being formed of corrugated paper board and one having its grain extending transversely of the grain of the other sheet, and an air tight wrapper enclosing the stack and reinforcing sheets.

3. A refrigerator having hollow walls defining chambers communicating one with another, and blocks of insulation filling said chambers, each block consisting of a body of insulating material and a hermetically sealed water proof wrapper for the same, said blocks having contacting edge faces adhering to each other.

4. A refrigerator having hollow walls defining chambers communicating one with another, and blocks of insulation filling said chambers, each block consisting of a body of cellulose and a hermetically sealed wrapper of waterproofed paper, said blocks fitting snugly within said chambers and having their edge portions contacting along communicating edge portions of the chambers.

5. A refrigerator having hollow walls defining chambers communicating one with another, and blocks of insulation filling said chambers, each block consisting of a body of cellulose and a hermetically sealed wrapper of waterproofed paper, said blocks fitting snugly within said chambers and having bevelled edge faces contacting along communicating edge portions of the chambers.

6. A refrigerator having hollow walls defining chambers communicating one with another, and blocks of insulation filling said chambers, each block consisting of a body of cellulose and a hermetically sealed wrapper of waterproofed paper, said blocks fitting snugly within said chambers and having their edge portions contacting along communicating edge portions of the chambers and formed with stepped interengaging joints.

WHEELER S. SPRAGUE.